(12) United States Patent
Yoshikawa et al.

(10) Patent No.: US 7,131,347 B2
(45) Date of Patent: Nov. 7, 2006

(54) MANUAL GEARSHIFT DEVICE FOR AUTOMOTIVE AUTOMATIC TRANSMISSION

(75) Inventors: Kazuhiko Yoshikawa, Hiroshima (JP); Yoshinori Ohtsubo, Hiroshima (JP); Yasuyuki Inai, Hiroshima (JP); Kouji Furukawa, Hiroshima (JP); Akira Nakayama, Hiroshima (JP); Shingo Kunihiro, Hiroshima (JP); Akiko Ogasawara, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/215,076

(22) Filed: Aug. 31, 2005

(65) Prior Publication Data

US 2005/0284248 A1 Dec. 29, 2005

Related U.S. Application Data

(63) Continuation of application No. 10/272,298, filed on Oct. 17, 2002, now Pat. No. 6,948,399.

(30) Foreign Application Priority Data

Oct. 17, 2001 (JP) ............................ 2001-318898

(51) Int. Cl.
*B60K 17/04* (2006.01)

(52) U.S. Cl. ............................. 74/473.12; 74/473.18; 74/484 R

(58) Field of Classification Search ............. 74/473.12, 74/473.18, 473.3, 473.33, 484 R, 484 H, 74/552

See application file for complete search history.

(56) References Cited

U.S. PATENT DOCUMENTS

| 5,335,743 | A | | 8/1994 | Gillbrand et al. |
| 5,365,803 | A | * | 11/1994 | Kelley et al. .............. 74/484 R |
| 5,520,066 | A | * | 5/1996 | Tueri ......................... 74/484 R |
| 5,865,705 | A | * | 2/1999 | Shamoto et al. ............... 477/79 |
| 6,053,066 | A | | 4/2000 | Ishii et al. |
| 6,409,287 | B1 | | 6/2002 | Leach et al. |
| 6,474,187 | B1 | * | 11/2002 | Vollmar .................... 74/336 R |
| 6,741,923 | B1 | * | 5/2004 | Katakura et al. ........... 701/101 |
| 6,842,683 | B1 | * | 1/2005 | Kim ............................ 701/70 |

FOREIGN PATENT DOCUMENTS

DE 43 11 852 A1 9/1994

(Continued)

OTHER PUBLICATIONS

Patent Abstract of Japan vol. 018, No. 227 (M-1597), Apr. 25, 1994 & JP 06 017911 A (Mazda Motor Corp.) Jan. 25, 1994 *abstract*.

*Primary Examiner*—David Fenstermacher
(74) *Attorney, Agent, or Firm*—Nixon Peabody LLP; Donald R. Studebaker

(57) ABSTRACT

A manual gearshift device for an automotive automatic transmission operative in an automatic shift mode in which a gear ratio is automatically varied according to driving conditions and a manual mode in which a gear ratio is manually changed is disclosed. The manual gear shift device, that is installed to spokes of a steering wheel extending in substantially diametrically opposite horizontal directions, comprises a first gearshift switch which is installed to one of the spokes at an obverse side of the steering wheel and provides a shift-up command signal and a second gearshift switch, desirably different in shape and operative direction from the first gearshift switch, which is installed to one of the spokes at a reverse side of the steering wheel and provides a shift-up command signal.

8 Claims, 3 Drawing Sheets

FOREIGN PATENT DOCUMENTS

| | | |
|---|---|---|
| EP | 0 941 886 A3 | 9/1999 |
| JP | 06-17911 A | 1/1994 |
| JP | 08-80759 A | 3/1996 |
| JP | 09-226403 A | 9/1997 |

* cited by examiner

MANUAL GEARSHIFT DEVICE FOR AUTOMOTIVE AUTOMATIC TRANSMISSION

BACKGROUND OF THE INVENTION

1. Field of the Invention

The present invention relates to a gearshift device for an automotive automatic transmission.

2. Description of Related Art

There have widely been known transmission control devices for automotive vehicles that operates an automatic transmission selectively in two gearshift modes, namely an automatic gearshift mode and a manual gearshift mode, according to driver's preference or driving circumstances. The automatic gearshift mode is the mode in which the automatic transmission is automatically varied in gear ratio according to a driving conditions including an engine loading and a vehicle speed. The manual gearshift mode is the mode in which the automatic transmission is shifted up or down one gear step by step by operating a manual gearshift device such as comprising gearshift switches.

A variety of manual gearshift devices are known in the art. One example of such a manual gearshift device that is disclosed in Japanese Unexamined Patent Publication No. 6-17911 comprises two gearshift switches installed on one of spokes of a steering wheel, namely a shift-up switch for providing a transmission control apparatus with a shift-up command signal and a shift-down switch for providing the transmission control apparatus with a shift-down command signal. This type of manual gearshift device enables the driver to operate the shift-up switch or the shift-down switch without taking his or her hand off from the steering wheel, so as to provide operational facility.

However, the prior art manual gearshift device for an automatic transmission is often accompanied by the fear of causing a gearshift in an unintended direction resulting from touching one of these shift-up switch and shift-down switch in mistake for another. Such a wrong operation is brought about due to an arrangement of these shift-up switch and shift-down switch in proximity to each other on a same spoke of the steering wheel.

SUMMARY OF THE INVENTION

It is an object of the present invention to provide a manually operable gearshift device for an automatic transmission which is improved in operationality and provides facilitated gearshift operation, shift-up operation or downshift operation, without being accompanied by a fear for wrong operation.

The foregoing object of the present invention is accomplished by a manual gearshift device installed to a steering wheel with at least a pair of spokes extending in substantially diametrically opposite horizontal directions, more specifically to at least one of the spokes of the steering wheel, that is operative to provide a shift-up or a sift-down command signal for causing an automotive automatic transmission to shift one gear up or down every time the manual gearshift device is operated. The manual gearshift device comprises a manually operable first gearshift switch installed to either one, or more desirably each one, of the spokes at an obverse side of the steering wheel and operative to provide either one of the shift-up command signal and the shift-down command signal and a manually operable second gearshift switch installed to either one, more desirably each one, of the spokes at a reverse side of the steering wheel and operative to provide another one of the shift-up command signal and the shift-down command signal. The first and second gearshift switches are desirably different in shape from each other.

The manual gearshift device enables the driver to shift the automatic transmission one gear up or down by operating the first gearshift switch or the second gearshift switch laying his or hear hands on the steering wheel. Furthermore, the manual gearshift device puts the driver under the necessity of operating the first and second gearshift switches from opposite sides of the steering wheel and provides a visual and tactile distinction between shapes of the first and second gearshift switches, so that the driver can ward off a wrong manual gearshift.

The first and second gearshift switches are desirably located above and below a transversely horizontal center line of the steering wheel remaining in a neutral position wherein the steering angle remains zero, respectively, so as to be operable at different positions remote from each other. This location of the first and second gearshift switches is contributory to warding of a wrong manual gearshift and also to good operability.

The first gearshift switch is desirably located below a substantially horizontal line tangential to a top edge of a horn pad at a central region of the steering wheel from the spokes extend in substantially diametrically opposite directions when the steering wheel is in the neutral position. This location of the first gearshift switch does not block the driver's forward view toward various instruments and gauges.

The first gearshift switch is desirably of a type that is actuated when pushed down toward the reverse side of the steering wheel from the obverse side of the steering wheel, and the second gearshift switch is desirably of a type that is actuated when pushed up toward the obverse side of the steering wheel from the reverse side of the steering wheel. These gearshift switch thus operated prevents the driver's hands or fingers from brushing against an instrument panel and/or operating or control members such as combination switches positioned between the instrument panel and the steering wheel.

The first and second gearshift switches may be charged with providing the shift-down command signal and the shift-up command signal, respectively. Since the first gearshift switch that serves as a switch for causing a shift-down that is used in dire need of a gearshift upon, for example, an acceleration demand, and is demanded frequently is located in a position easily accessible by the driver's finger, the manual gearshift device is quite user-friendly.

As can be seen, the manual gearshift device is used conveniently with improved operability but without a fear for a wrong gearshift.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1A:
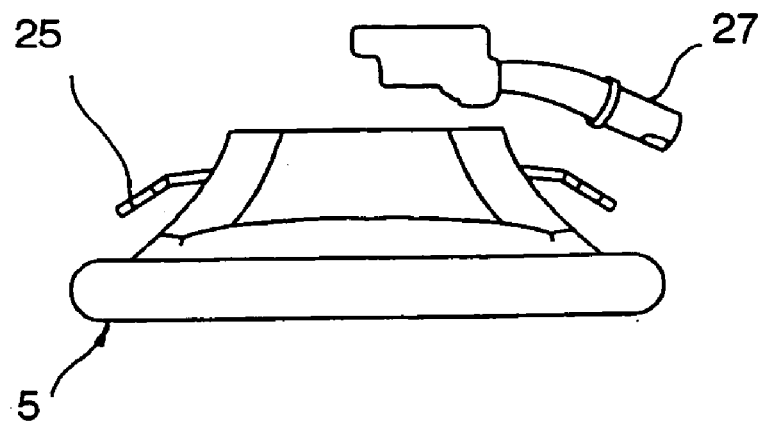
FIG. 1A is a top plan view of a steering wheel in a neutral position which is equipped with a manual gearshift device according to an embodiment of the present invention.
Figure 1B:
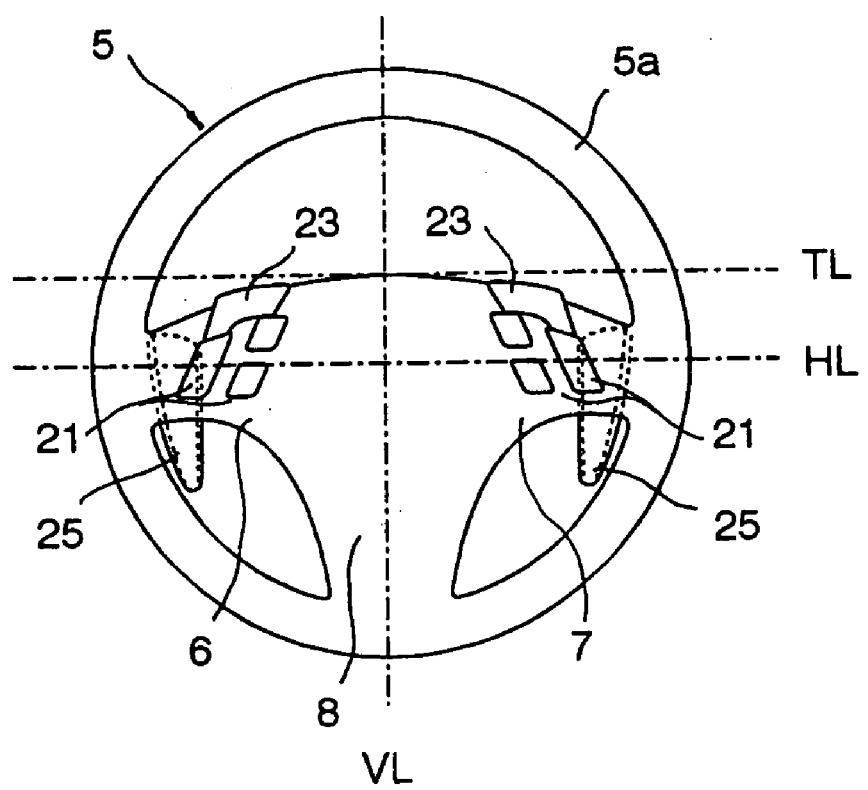
FIG. 1B is a front elevational view of the steering wheel of FIG. 1A.
Figure 2:
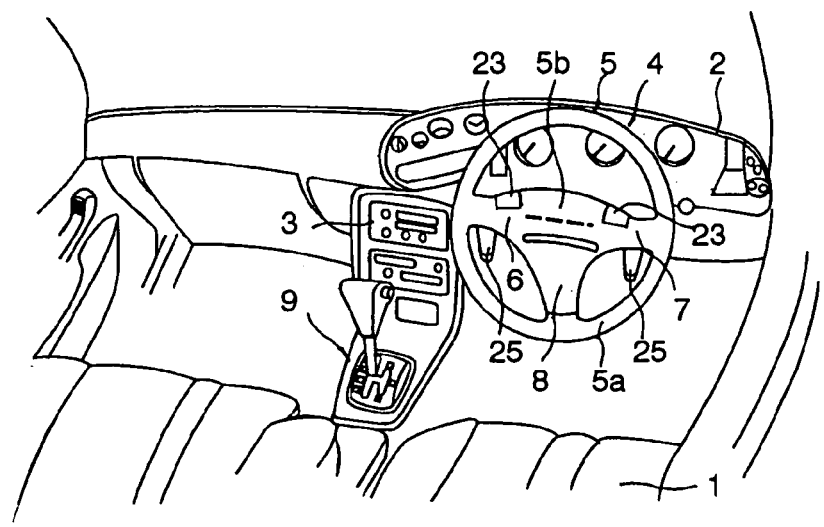
FIG. 2 is a perspective view of a passenger compartment of an automotive vehicle which can be equipped with the manual gearshift device.

Referring to the drawings in detail, and, in particular, to FIG. 2 showing a front part of a passenger compartment of an automotive vehicle which is provided with a manually operable gearshift device for an automatic transmission according to an embodiment of the present invention, there is an instrument panel 2 in front of a driver's seat 1 in the passenger compartment. The instrument panel 2 mounts carious instruments, meter gauges, switches and the like thereon and is provided with an audio unit 3 installed thereto in front of a center console 10. The center console 10 is located on one side of the driver's seat 1 and extends rearward from the audio unit 3. A steering apparatus 4 including a steering wheel 5 and a steering column (not shown) extending obliquely upward toward the driver. The steering wheel 5 comprises a wheel ring 5a, a horn pad 5b, first and second horizontal bracing spokes 6 and 7 and a vertical bracing spoke 8. The spokes 6, 7 and 8 rigidly connect the horn pad 5b to the wheel ring 5a. The first and second horizontal bracing spokes 6 and 7 having recurved edges, respectively, extend in diametrically opposite directions, respectively, from the horn pad 5b to the steering wheel 5 so as to distance itself from the horizontal line TL tangential to the extreme top edge of the horn pad 5b. The vertical bracing spoke 8 extends straight down from the horn to the steering wheel 5. While the steering wheel 5 is in a neutral position, i.e. at a steering angle of zero, the first and second horizontal bracing spokes 6 and 7 are on a substantially horizontal center line HL (see FIG. 1B) transversely passing through the center of the steering wheel 5 in a plane including the steering wheel 5 and the vertical bracing spoke 8 is on a vertical line VL (see FIG. 1B) passing through the center of the steering wheel 5 in the plane including the steering wheel 5. The steering column mounts a combination switch 27 thereon immediately below the steering wheel 5 (see FIG. 1A).

The manually operable gearshift device comprises two first or shift-down switches 23 and two second or shift-up switches 25 having paddle-shaped actuator levers. The shift-down switches 23, which are identical in structure and in operation with each other, are installed to the first and second spokes, respectively, at the obverse side, i.e. the rear side, of the steering wheel 5. The shift-up switches 25, which are identical in structure and in operation with each other, are installed to the first and second horizontal bracing spokes 6 and 7, respectively, on the reverse side, i.e. the front side, of the steering wheel 5. A gearshift mode and gear range selector device 9 including a selector lever 14 and an indicator panel 15 is disposed in the center console 10 as shown in FIG. 3.

Figure 3:
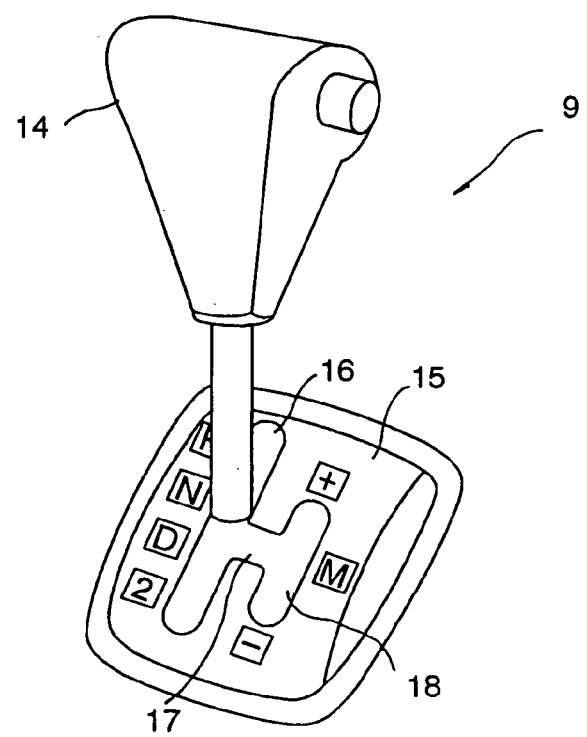
FIG. 3 is a perspective view of a gearshift mode and gear range selector device.

Referring to FIG. 3, the selector lever 14 is capable of swiveling in a lengthwise direction from the front to the back of the vehicle and a transverse direction perpendicular to the lengthwise direction. The indicator panel 15 has a generally H-shaped shift channel comprising a gear range selection slot 16 extending in the lengthwise direction, a manual gearshift slot 18 extending in parallel with the gear range selection slot 16 and a transverse connecting slot 17 extending in a transverse direction so as to interconnect the gear range selection slot 16 and the manual gearshift slot 18 to each other. There are set gear range select positions, for example in this embodiment, such as a park (P) range, a reverse (R) range, a neutral (N) range, a drive (D) range and a $2^{nd}$ (2) range in order from the front end to the rear end along the gear range shift slot 16. Further, there are set gearshift positions, namely a shift-up position (+) at the forward extremity of the manual gearshift slot 18 and a shift-down position (−) at the rearward extremity of the manual gearshift slot 18. The selector lever 14 clicks stop at each of the gear range select positions when it swivels in the gear range selection slot 16 in the lengthwise direction. The selector lever 14 can be forced to swivel in the transverse direction to move in the transverse connecting slot 17 only from the D range select position to an intersection (which is referred to as a neutral position M) between the transverse connecting slot 17 and the manual gearshift slot 18. The selector lever 14 in the neutral position M is neutralized by return springs (not shown). When the selector lever 14 is forced to swivel to the shift-up position (+) from the neutral position M against the return spring, the automatic transmission is shifted up one gear. When the selector lever 14 is released, the selector lever 14 swivels back to the neutral position M. Similarly, when the selector lever 14 is forced to swivel to the shift-down position (−) from the neutral position M against the return spring, the automatic transmission is shifted down one gear. When the selector lever 14 is released, the selector lever 14 swivels back to the neutral position M.

Referring to FIGS. 1A and 1B, each o the horizontal bracing spokes 6 and 7 is provided at the obverse side thereof with the shift-down switch 23 disposed along an upper edge and a set of three audio switches 21 arranged below the shift-down switches 23. In addition, each of the horizontal bracing spokes 6 and 7 is provided at its base with the shift-up switch 25 and extending along the inner periphery of the steering wheel 5. The shift-down switches 23 and the sets of three audio switches 21 are symmetrically disposed, respectively, with respect to the vertical center line VL and located below the transversely horizontal line TL. The shift-up switches 25 are symmetrically disposed with respect to the vertical center line VL and located on one side of the combination switch 27 remote from the instrument panel 2. The shift-down switch 23 is located so as to be operated above at least the substantially horizontal center line HL. The actuator lever of the shift-up switch 25 is located so as to be partly viewed and operated from above the steering wheel 5, in particular, through a space surrounded by the horizontal bracing spoke 6, 7 and the vertical bracing spoke 8.

Figure 4A:
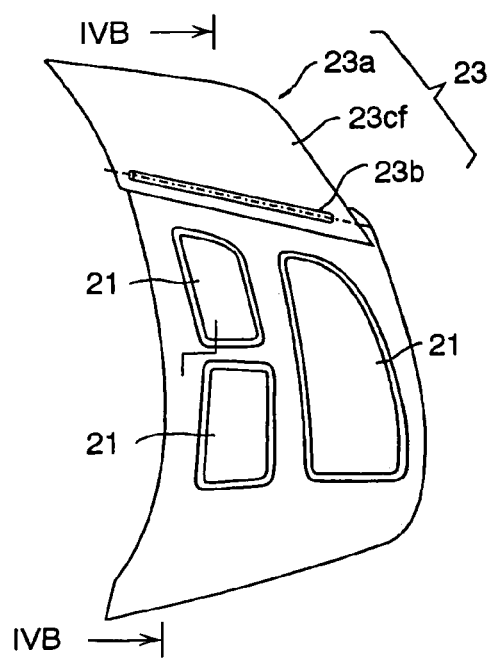
FIG. 4A is an enlarged front elevational view of a first gearshift switch of the manual gearshift switch.
Figure 4B:
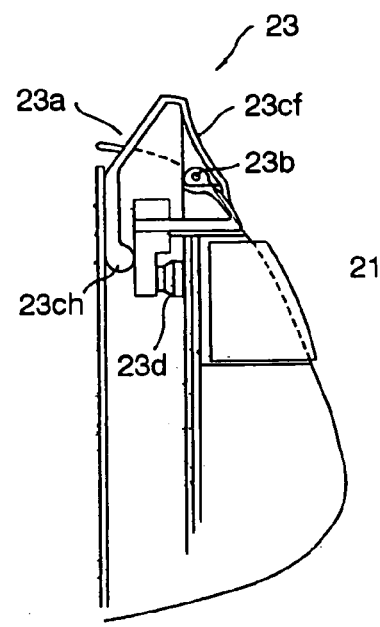
FIG. 4B is a cross-sectional view taken along line IVB—IVB of FIG. 4A.

Referring to FIGS. 4A and 4B showing the shift-down switch 23 in detail, the shift-down switch 23 comprises an actuator 23a pivotally mounted on a pivot shaft 23b installed to the horizontal bracing spoke 6, 7 and extending along the upper edge of the horizontal bracing spoke 6, 7 and a switch contact 23d installed within the horizontal bracing spoke 6, 7. The actuator 23a has a fingerboard 23cf and an actuator head 23ch formed as an integral piece. When the fingerboard 23cf is pushed down or forced to turn about the pivot shaft 23b in a counterclockwise direction as indicated by a symbol A as viewed in FIG. 4B, the actuator head 23ch turns in the counterclockwise direction as indicated by a symbol B and pushes the switch contact 23d, so that the shift-down switch 23 provides a shift-down command signal for the automatic transmission control system. The automatic transmission control system causes the automatic transmission to shift its gear down one gear whenever the selector lever 4 is in the neutral position M of the manual gearshift slot 18.

Figure 5A:
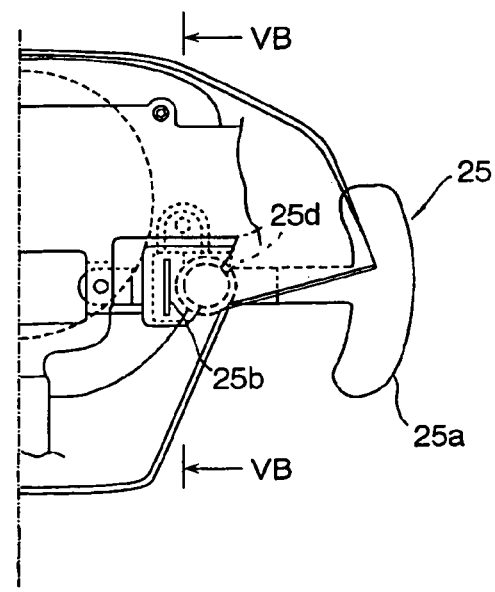
FIG. 5A is an enlarged front elevational view of a second gearshift switch of the manual gearshift switch.
Figure 5B:
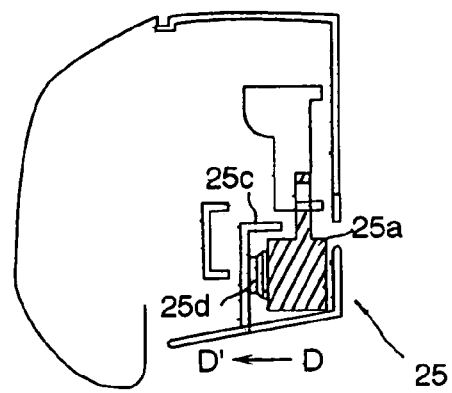
FIG. 5B is a cross-sectional view taken along line VB—VB of FIG. 5A.

Referring to FIGS. 5A and 5B showing the shift-up 25 in detail, the shift-up switch 25 comprises an actuator 25a pivotally mounted on a pivot shaft 25b that is installed within the horizontal bracing spoke 6, 7 and is spatially orthogonal with the pivot shaft 23a of the shift-down switch 23, and a switch contact 25d installed within the horizontal bracing spoke 6, 7. More specifically, an axis of the pivot shaft 25b is laid in a plane in parallel with a plane including the wheel ring 5a and is orthogonal with an axis of the pivot shaft 23a. The actuator 25a has a finger lever 25cl and an actuator head 23ch formed as an integral piece. When the finger lever 25cl is pulled toward the obverse side of the steering wheel 5, i.e. when the finger lever 25cl is turned about the pivot shaft 25b in a counterclockwise direction, the actuator head 25ch swings in a direction indicated by symbols D–D' and pushes the switch contact 25d, so that the shift-up switch 25 is actuated to provide a shift-down command signal for the automatic transmission control system. The automatic transmission control system causes the automatic transmission to shift its gear down one gear whenever the selector lever 4 is in the neutral position M of the manual gearshift slot 18.

In the operation of the manual gearshift device for an automatic transmission, whenever the selector lever 14 of the gearshift mode and gear range selector device 9 is in any one of the given gear range select positions, i.e. the park (P) range, the reverse (R) range, the neutral (N) range, the drive (D) range and the $2^{nd}$ (2) range, the automatic transmission is put operative in the automatic gearshift mode in a well known manner. Specifically, in the automatic gearshift mode, the automatic transmission control system automatically controls the automatic transmission in predetermined gearshift patterns designed in a control map according to driving conditions including a vehicle speed, a speed of turbine of a torque converter, an opening of engine throttle valve or an engine loading, etc. When it is intended to select the manual gearshift mode during driving, the selector lever 14 is moved to the neutral position M of the manual gearshift slot 18 through the transverse connecting slot 17 after having been located once in the drive (D) range selection position in the gear range selection slot 16. When the selector lever 14 reaches the neutral position M, the manually operable gearshift device, i.e. the shift-down switches 23 and the shift-up switches 25, is put functionally operative. In the manual gearshift mode, when either one of the shift-down switches 23 is pushed down, a shift-down command signal is sent to the automatic transmission control system so as to cause the automatic transmission to shift its gear down one gear. Similarly, when either one of the shift-up switches 25 is pushed up, a shift-up command signal is sent to the automatic transmission control system so as to cause the automatic transmission to shift its gear up one gear.

Otherwise, while the selector lever 14 remains in the neutral position M, the automatic transmission is operative in the manual gearshift mode using the selector lever 14. Specifically, when the selector lever 14 is forced forward from the neutral position M to the shift-up position (+) at the forward extremity of the manual gearshift slot 18, a shift-up switch (not shown but functionally identical with the shift-down switch 25) included in the gearshift mode and gear range selector device 9 is actuated to provide a shift-up command signal for the automatic transmission control system. Similarly, when the selector lever 14 is forced rearward from the neutral position M to the shift-down position (−) at the rearward extremity of the manual gearshift slot 18, a shift-down switch (not shown but functionally identical with the shift-down switch 23) included in the gearshift mode and gear range selector device 9 is actuated to provide a shift-down command signal for the automatic transmission control system. Every time the automatic transmission control system receives the shift-up command signal or the shift-down command signal, the automatic transmission control system causes the automatic transmission to shift its gear up or down one gear. When the selector lever 14 has reached the shift-up position (+) or the shift-down position (−) once, the selector lever 14 is automatically returned to the neutral position M by the return spring.

When the selector lever 14 is forced back into the gear range selection slot 16, while all of the shift-down switches 23 and the shift-up switches 25 (and the shift-down switch and the shift-up switch associated to the selector lever 14) are put functionally inoperative, the automatic gearshift mode is reinstated.

As just describe above, since the automatic transmission is shifted up or down one gear every time the shift-down switch 23 or the shift-up switch 25 is pushed or every time the selector lever 14 is moved forward or rearward, the driver has a feeling of driving the vehicle as close as being equipped with a manual transmission.

The manual gearshift device enables the driver to operate the shift-up switch for a shift-down or the shift-down switch for a shift-up without taking his or her hand off from the steering wheel, puts the driver under the necessity of operating the first and second gearshift switches from opposite sides of the steering wheel and provides a visual and tactile distinction between shapes of the first and second gearshift switches, so as to provide enhanced operational facility, to enable the driver to ward off a wrong manual gearshift. In addition, the first gearshift switch that serves as a switch for causing a shift-down used frequently is easily accessible by the driver's finger, the manual gearshift device is quite user-friendly.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A manual gearshift device for providing a gearshift command signal for shift-up or shift-down operative to cause an automotive automatic transmission to shift one gear up or down every time of manual operation thereof, said manual gearshift device comprising:

a steering wheel having at least a wheel ring and a pair of spokes extending in substantially diametrically opposite directions;

a first gearshift switch having a manually operable first lever which is installed on said spoke at an obverse side of said steering wheel above a transversely horizontal center line of said steering wheel that is in a neutral position so that an upper end thereof is pendent beyond an upper edge of said spoke and actuated to provide a gearshift command signal for either one of shift-up and shift-down when said manually operable first lever is operated; and a second gearshift switch having a manually operable second lever which is installed on said steering wheel at said reverse side of said steering wheel below said transversely horizontal center line so that a lower end thereof extends from behind said spoke to be pendent beyond a lower edge of said spoke and actuated to provide a gearshift command signal for the other of shift-up and shift-down when said manually operable second lever is operated.

2. A manual gearshift device for providing a gearshift command signal for shift-up or shift-down operative to cause an automotive automatic transmission to shift one gear up or down every time of manual operation thereof, said manual gearshift device comprising:

a steering wheel having at least a wheel ring and a pair of spokes extending in substantially diametrically opposite directions;

gear selection means disposed spatially aside from said steering wheel and movable in a lengthwise direction of the automotive for causing said automotive automatic transmission to select a forward gear and a reverse gear;

a first gearshift switch having a manually operable first lever which is installed on said spoke at an obverse side of said steering wheel above a transversely horizontal center line of said steering wheel that is in a neutral position so that an upper end thereof is pendent beyond an upper edge of said spoke and actuated to provide a gearshift command signal for either one of shift-up and shift-down when said manually operable first lever is operated; and a second gearshift switch having a manually operable second lever which is installed on said steering wheel at said reverse side of said steering wheel below said transversely horizontal center line so as to extend from behind said spoke and actuated to provide a gearshift command signal for the other of shift-up and shift-down when said manually operable second lever is operated;

wherein said gear selection means is capable of swiveling in a transverse direction of the automobile while selecting said forward gear and allows said first gearshift switch and said second gearshift switch to be actuated when swiveled in said transverse direction.

3. The manual gearshift device as defined in claim 2, wherein said manually operable first lever and said manually operable second lever are operative in opposite directions.

4. The manual gearshift device as defined in claim 3, wherein said manually operable first lever is operative toward said reverse side of said steering wheel and said manually is operative toward said obverse side of said steering wheel.

5. The manual gearshift device as defined in claim 2, wherein said gear selection means is allowed to swivel toward a driver's seat of the automotive in said transverse direction.

6. A manual gearshift device for providing a gearshift command signal for shift-up or shift-down operative to cause an automotive automatic transmission to shift one gear up or down every time of manual operation thereof, said manual gearshift device comprising:

a steering wheel having at least a wheel ring and a pair of spokes extending in substantially diametrically opposite directions;

gear selection means disposed spatially aside from said steering wheel for causing said automotive automatic transmission to select a forward gear and a reverse gear;

a first gearshift switch having a manually operable first lever which is installed on said spoke at an obverse side of said steering wheel above a transversely horizontal center line of said steering wheel that is in a neutral position so that an upper end thereof is pendent beyond an upper edge of said spoke and actuated to provide a gearshift command signal for either one of shift-up and shift-down when said manually operable first lever is operated to a reverse side of said steering wheel; and a second gearshift switch having a manually operable second lever which is installed on said steering wheel at said reverse side of said steering wheel below said transversely horizontal center line so as to extend from behind said spoke and actuated to provide a gearshift command signal for the other of shift-up and shift-down when said manually operable second lever is operated toward said obverse side of said steering wheel;

wherein said gear selection means is capable of swiveling in a transverse direction of the automobile while selecting said forward gear and allows said first gearshift switch and said second gearshift switch to be actuated when swiveled in said transverse direction.

7. The manual gearshift device as defined in claim 6, wherein said gear selection means is movable in a lengthwise direction of the automotive for selection of said forward gear and said reverse gear.

8. The manual gearshift device as defined in claim 2, wherein said gear selection means is allowed to swivel toward a driver's seat of the automotive in said transverse direction.

* * * * *